US012487992B2

(12) United States Patent
Labuda et al.

(10) Patent No.: US 12,487,992 B2
(45) Date of Patent: *Dec. 2, 2025

(54) TRANSACTION BLOCK PROCESSING FOR CONDITIONAL COMMIT DATABASES

(71) Applicant: Matrixx Software, Inc., Wilmington, DE (US)

(72) Inventors: David Labuda, Hillsborough, CA (US); Deepak Bisht, Fremont, CA (US); Ian Marshall, Sunnyvale, CA (US); Ming-Wen Sung Hwang, Saratoga, CA (US)

(73) Assignee: Matrixx Software, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/792,429

(22) Filed: Aug. 1, 2024

(65) Prior Publication Data

US 2024/0394247 A1    Nov. 28, 2024

Related U.S. Application Data

(63) Continuation of application No. 18/076,815, filed on Dec. 7, 2022, now Pat. No. 12,079,204.

(51) Int. Cl.
   *G06F 16/23*    (2019.01)
(52) U.S. Cl.
   CPC ................ *G06F 16/2379* (2019.01)

(58) Field of Classification Search
   CPC .................................................. G06F 16/2379
   See application file for complete search history.

(56) References Cited

U.S. PATENT DOCUMENTS

| | | |
|---|---|---|
| 2019/0251080 A1* | 8/2019 | Lu .............................. G06F 7/14 |
| 2019/0370365 A1 | 12/2019 | Chalakov |
| 2020/0159846 A1 | 5/2020 | Dixit |
| 2021/0194697 A1 | 6/2021 | Chan |

* cited by examiner

*Primary Examiner* — Khanh B Pham
*Assistant Examiner* — Kweku William Halm
(74) *Attorney, Agent, or Firm* — Van Pelt, Yi & James LLP

(57) ABSTRACT

A database system includes an interface and a processor. The interface is configured to receive a transaction request comprising one or more transaction blocks in an order. The processor is configured to evaluate each transaction block of the one or more transaction blocks in the order by: determining in the order whether a condition expression of a transaction block of the one or more transaction blocks is true; and in response to the condition expression of the transaction block being true, adding in the order one or more associated action sets of the transaction block to a transaction context; and in response to each of the transaction blocks being evaluated, cause the transaction context to be executed as an atomic transaction.

19 Claims, 16 Drawing Sheets

TRANSACTION BLOCK PROCESSING FOR CONDITIONAL COMMIT DATABASES

CROSS REFERENCE TO OTHER APPLICATIONS

This application is a continuation of U.S. patent application Ser. No. 18/076,815, entitled TRANSACTION BLOCK PROCESSING FOR CONDITIONAL COMMIT DATABASES filed Dec. 7, 2022 which is incorporated herein by reference for all purposes.

BACKGROUND OF THE INVENTION

A conditional commit database is able to operate more efficiently by avoiding some transaction conflicts in data access caused by locking. However, the ability of the conditional commit database to process multiple transactions without locking means that there are situations when the conditional commits can cause transactions to be invalidated. This inefficiency is a problem as the invalidation of the transaction requires that the transaction be rerun to complete processing.

BRIEF DESCRIPTION OF THE DRAWINGS

Various embodiments of the invention are disclosed in the following detailed description and the accompanying drawings.

DETAILED DESCRIPTION

Figure 1:
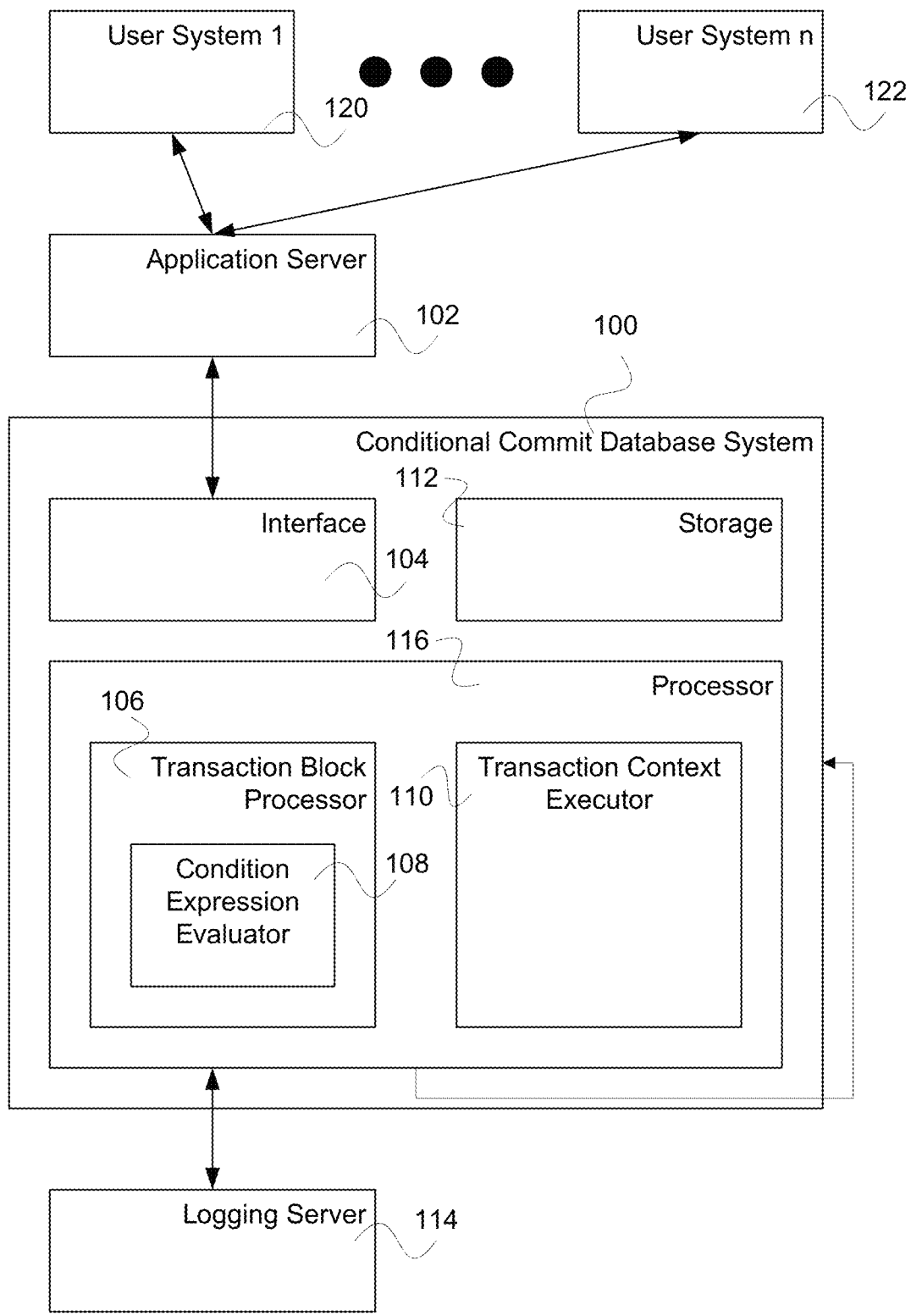
FIG. 1 is a block diagram illustrating an embodiment of a conditional commit database system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Transaction block processing for conditional commit databases is disclosed. The database system includes an interface and a processor. The interface is configured to receive a transaction request comprising one or more transaction blocks in an order. The processor is configured to 1) evaluate each transaction block of the one or more transaction blocks in the order by: a) determining in the order whether a condition expression of a transaction block of the one or more transaction blocks is true; and b) in response to the condition expression of the transaction block being true, adding in the order one or more associated action sets of the transaction block to a transaction context; and 2) in response to each of the transaction blocks being evaluated, cause the transaction context to be executed as an atomic transaction.

Using transaction block processing a transaction can create processing conditions that avoid inefficiencies. The transaction blocks are processed in order and enable complex conditions to be met for a series of actions that need to be executed. Each transaction block includes a condition expression, which is evaluated to be either true, false, or null. In some embodiments, if the condition expression is null, then it should be assumed to be true. For a true evaluation of the condition expression, the one or more action sets associated with the transaction block are indicated to be executed in the order (e.g., stored in a transaction context and the later executed as an atomic transaction with other action sets of the overall transaction).

In some embodiments, the one or more action sets associated with a transaction block include an instruction for data in the database (e.g., a create or an insert instruction, a delete instruction, an update instruction, or any appropriate combination of these instructions, etc.).

In some embodiments, the condition expression of the transaction block comprises a Boolean expression that is evaluated as either true, false, or null. In some embodiments, the Boolean expression includes a Boolean operator. The Boolean expression can contain any number of instances of any of the common Boolean operations (e.g., AND, OR, XOR, NAND, NOR, XNOR, NOT, etc.). In some embodiments, the Boolean expression includes an operand comprising a previously evaluated transaction block condition expression. In some embodiments, the Boolean expression includes an operand comprising a condition set. In various embodiments, the condition set comprises one or more of the following: a greater than or a greater than or equal to operator, a less than or less than or equal to operator, an equal to operator, a time and/or a date, a database data and a condition using the database data (e.g., a condition related to a value of the database data, a condition related to whether the database data was previously read, previously written, not previously read, not previously written, a prior read time and/or a read date, a prior write time and/or a write date, a current value of database data, a relative value from current value of database data, etc.). In various embodiments, data in the database comprises numbers, strings, dates, times, bytes, floating point values, or any other appropriate data.

Transaction block processing for conditional commit for a database is disclosed. The conditional commit database does not lock data that is read by an application and used during a transaction calculation or preparation. This means that the value of a data element in the database may change between the time it is read by the application (e.g., before or during a calculation phase) and the time the transaction commit request is received and processed by the database (e.g., post calculation phase). This is the reason behind why conditions must be applied to the transaction to ensure that the transaction remains valid at the time of commit.

Because the database does not lock for the time during which an application manipulates data, the database is able to read, write, or otherwise access data in the database even when other operations are active. To avoid problems in processing a transaction, the system uses conditions and transaction blocks. The conditions limit the execution of portions or all of a transaction to appropriate circumstances and segmenting a transaction into one or more transaction blocks enables handling of more complex scenarios than a single structure transaction with one set of actions that are all executed on passing of a single set of conditions. For example, writing an update to a database entry is dependent on one or more of the following: another database entry's value having stayed the same, being above a certain value, having not changed more than a certain amount since a prior reading of a value, being below a certain value, having changed more than a certain amount since a prior reading of a value, having been written (or updated) since a prior reading, having been not written (or not updated) since a prior specific reading, having been read or not read since a prior reading, having been written or not written since a prior specific writing, having been read or not read since a prior writing, or any other appropriate condition. Transaction blocks with their conditions are each evaluated in order as listed in the transaction and then indicated to be executed, if their conditions pass. A database can then reduce, if not eliminate, overheads associated with access locking and, with the sequence of transaction blocks with their conditional tests, avoid inefficient situations that may cause transactions to fail and be rerun. There are many situations where portion A of a transaction can meet its conditions and commit, while portion B of a transaction cannot meet its conditions and commit-if they are combined into a single transaction block then the entire block must evaluate to FALSE and the entire transaction be rerun. However, using transaction block processing, it is possible to commit portion A but not commit portion B. In the event that a database entry does not satisfy a given transaction block condition(s) associated with the conditional write, then the application receives indications of which transaction blocks failed their conditions and were not executed and can determine whether to restart the process or resubmit specific transaction blocks for recalculation. For a database where the probability of a problem situation arising from inappropriate access of database entries by applications is low, then database overheads for access locking are reduced or eliminated for all database interactions in favor of rapidly handling transaction block actions and conditions.

The transaction block processing for conditional commit databases improves the computer by enabling faster processing of transactions by reducing locks on data and avoiding inefficiencies within conditional commits by including multiple transaction block processing for a given transaction each with its own conditions.

FIG. 1 is a block diagram illustrating an embodiment of a conditional commit database system. In the example shown, conditional commit database system 100 receives a request from a user using one of a plurality of user systems (e.g., user system 1 120, user system n 122, etc.) via application server 102. Application server 102 provides a transaction request (generated as a result of the user request) to interface 104 of conditional commit database system 100 for processing. Processor 116 receives the transaction request from interface 104 and proceeds to process each transaction block in order of the transaction request using transaction block processor 106. Specifically, for each transaction block a condition expression is evaluated using condition expression evaluator 108 and in response to the condition expression being true, the corresponding action list for the transaction block is added to a transaction context (e.g., a set of ordered action lists from transaction blocks whose condition expressions have passed having been evaluated as true). After all the transaction blocks have been evaluated, transaction context executor 110 executes the action lists in the order that are listed as part of the transaction context. Data stored in storage 112 is updated upon execution of action lists. In various embodiments, storage 112 is used for storing database data, transaction data, or any other appropriate data. Logging server 114 receives indications of transaction block passing or not passing each of their condition expression(s). Logging server 114 also receives indications of transaction block action list execution associated with each transaction block.

Figure 2A:
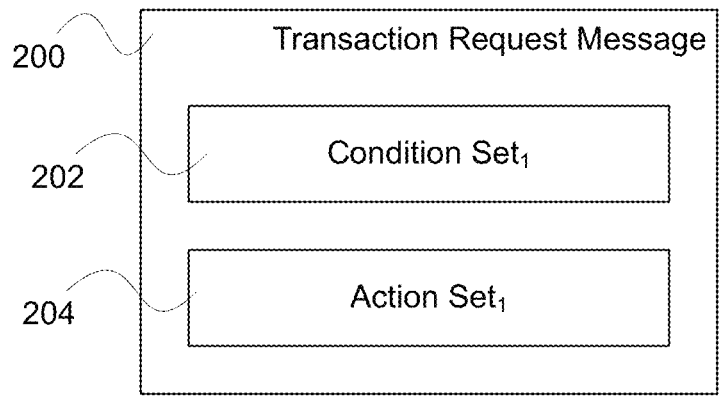
FIG. 2A is a diagram illustrating an embodiment of a transaction request message.

FIG. 2A is a diagram illustrating an embodiment of a prior art transaction request message. In some embodiments, transaction request message of FIG. 2A is processed by transaction block processor 106 of FIG. 1. In the example shown, transaction request message 200 includes condition $set_1$ 202 and action $set_1$ 204. Transaction message 200 includes only a single condition $set_1$ 202 (e.g., that includes a list of base conditions per FIG. 3A) that if evaluated to be true leads to a single action set of action $set_1$ 204 being executed.

Figure 2B:
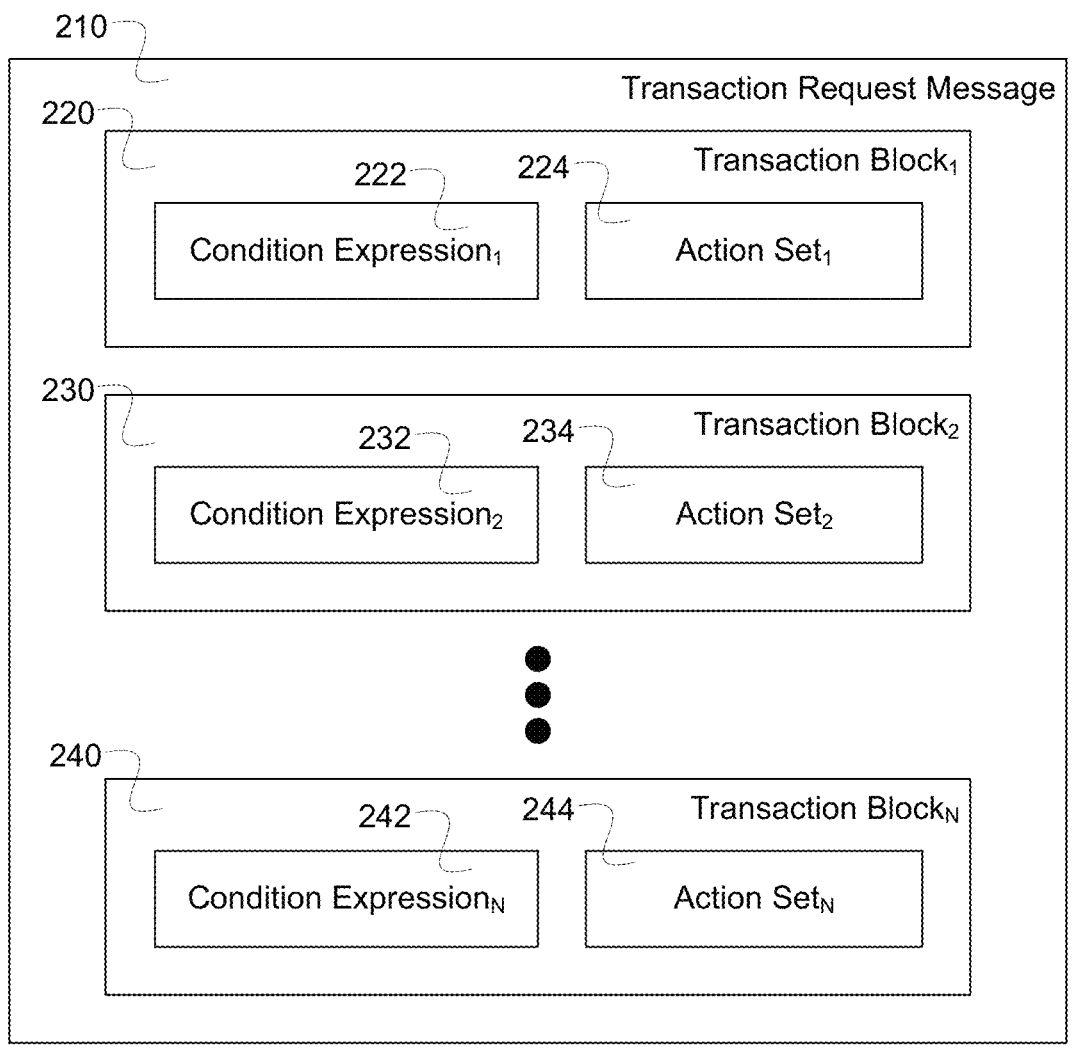
FIG. 2B is a diagram illustrating an embodiment of a transaction request message.

FIG. 2B is a diagram illustrating an embodiment of a transaction request message. In some embodiments, transaction request message of FIG. 2B is processed by transaction block processor 106 of FIG. 1. In the example shown, transaction request message 210 includes a plurality of transaction blocks (e.g., transaction $block_1$ 220, transaction $block_2$ 230, . . . transaction $block_N$ 240, etc.). Transaction $block_1$ 220 includes condition $expression_1$ 222 and action $set_1$ 224. Transaction $block_2$ 230 includes condition expression$_2$ 232 and action set$_2$ 234. Transaction block$_N$ 240 includes condition expression$_N$ 242 and action set$_N$ 244. The ordered transaction blocks are evaluated by the system in order and a transaction context is generated to execute the transaction block action sets in the order only if the block condition expression associated with a given transaction block action set has been evaluated to be true.

Figure 2C:
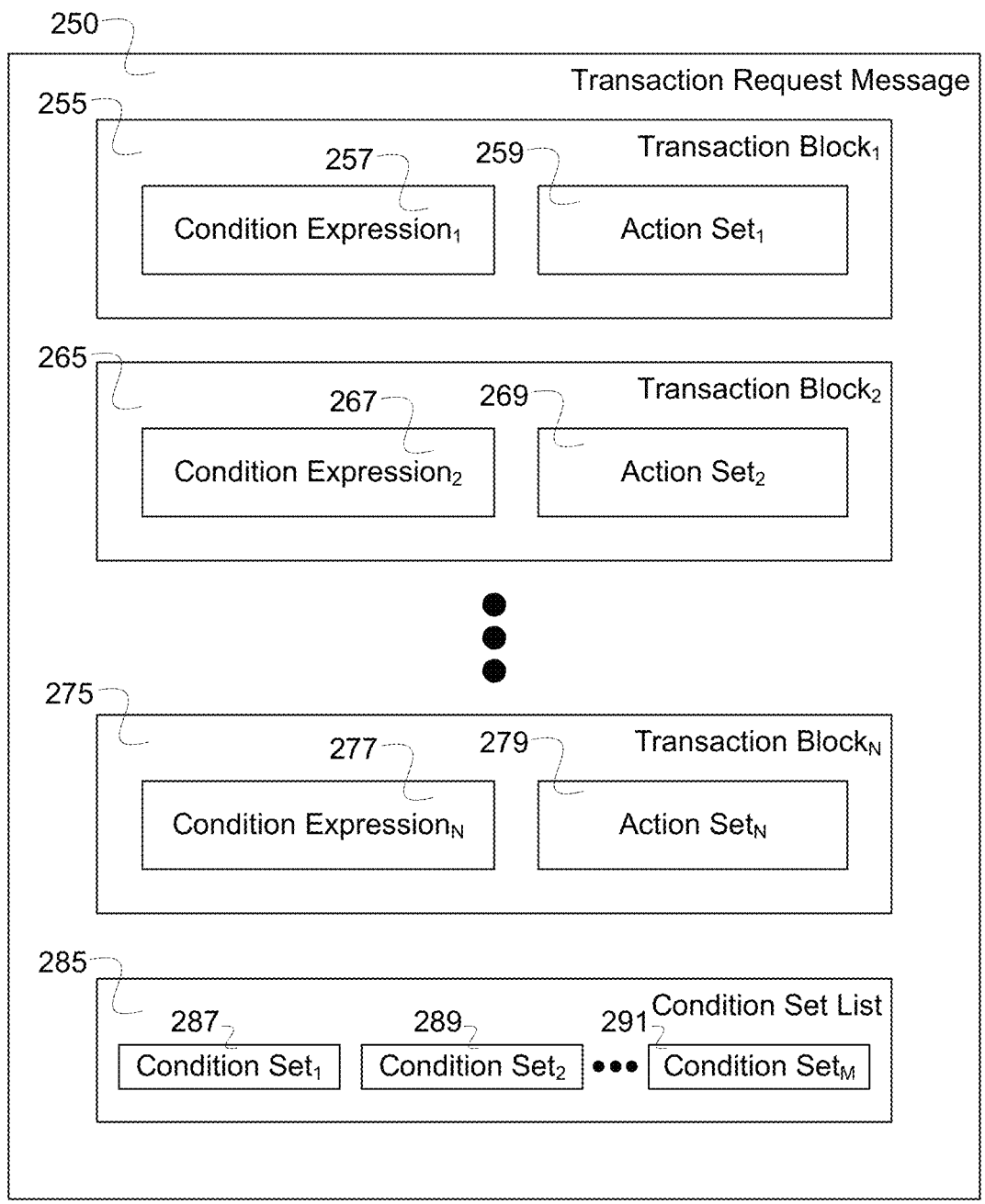
FIG. 2C is a diagram illustrating an embodiment of a transaction request message.

FIG. 2C is a diagram illustrating an embodiment of a transaction request message. In some embodiments, transaction request message of FIG. 2C is processed by transaction block processor 106 of FIG. 1. In the example shown, transaction request message 250 includes a plurality of transaction blocks (e.g., transaction block$_1$ 255, transaction block$_2$ 265, . . . transaction block$_N$ 275, etc.). Transaction block$_1$ 255 includes condition expression$_1$ 257 and action set$_1$ 259. Transaction block$_2$ 265 includes condition expression$_2$ 267 and action set$_2$ 269. Transaction block$_N$ 275 includes condition expression$_N$ 277 and action set$_N$ 279. The ordered transaction blocks are evaluated by the system in order, and a transaction context is generated in order to execute the transaction block action sets in order after all the block condition expressions have been evaluated. Condition expressions can use condition sets in condition set list 285 to construct any given condition expression. Condition set list 285 includes condition set$_1$ 287, condition set$_2$ 289, . . . condition set$_M$ 291, etc.

In some embodiments, the condition expression or a condition set of the transaction block comprises a Boolean expression that is evaluated as either true, false, or null. In some embodiments, the Boolean expression includes a Boolean operator. The Boolean expression can contain any number of instances of any of the common Boolean operations (e.g., AND, OR, XOR, NAND, NOR, XNOR, NOT, etc.). In some embodiments, the Boolean expression includes an operand comprising a previously evaluated transaction block condition expression. In some embodiments, the Boolean expression includes an operand comprising a condition set. In various embodiments, the condition set comprises one or more of the following: a greater than or a greater than or equal to operator, a less than or less than or equal to operator, an equal to operator, a time and/or a date, a database data and a condition using the database data (e.g., a condition related to a value of the database data, a condition related to whether the database data was previously read, previously written, not previously read, not previously written, a prior read time and/or a read date, a prior write time and/or a write date, a current value of database data, a relative value from current value of database data, etc.). In various embodiments, data in the database comprises numbers, strings, dates, times, bytes, floating point values, or any other appropriate data.

Figure 2D:
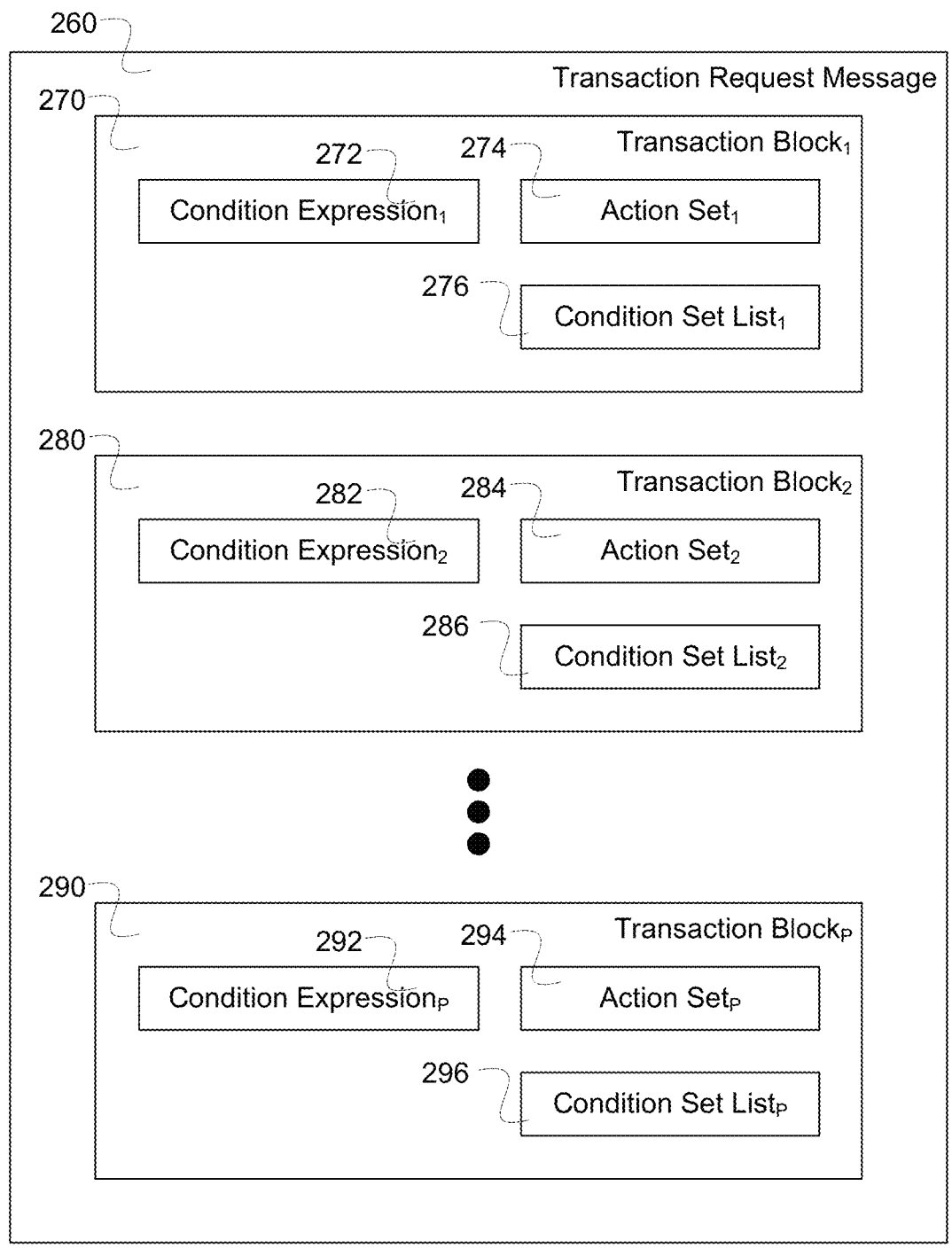
FIG. 2D is a diagram illustrating an embodiment of a transaction request message.

FIG. 2D is a diagram illustrating an embodiment of a transaction request message. In some embodiments, transaction request message of FIG. 2D is processed by transaction block processor 106 of FIG. 1. In the example shown, transaction request message 260 includes a plurality of transaction blocks (e.g., transaction block$_1$ 270, transaction block$_2$ 280, . . . transaction block$_N$ 290, etc.). Transaction block$_1$ 270 includes condition expression$_1$ 272, action set$_1$ 274, and condition set list$_1$ 276. Transaction block$_2$ 280 includes condition expression$_2$ 282, action set$_2$ 284, and condition set list$_2$ 286. Transaction block$_P$ 290 includes condition expression$_P$ 292, action set$_P$ 294, and condition set list$_P$ 296. The ordered transaction blocks are evaluated by the system in order, and a transaction context is generated in order to execute the transaction block action sets in order after all the block condition expressions have been evaluated.

Figure 3A:
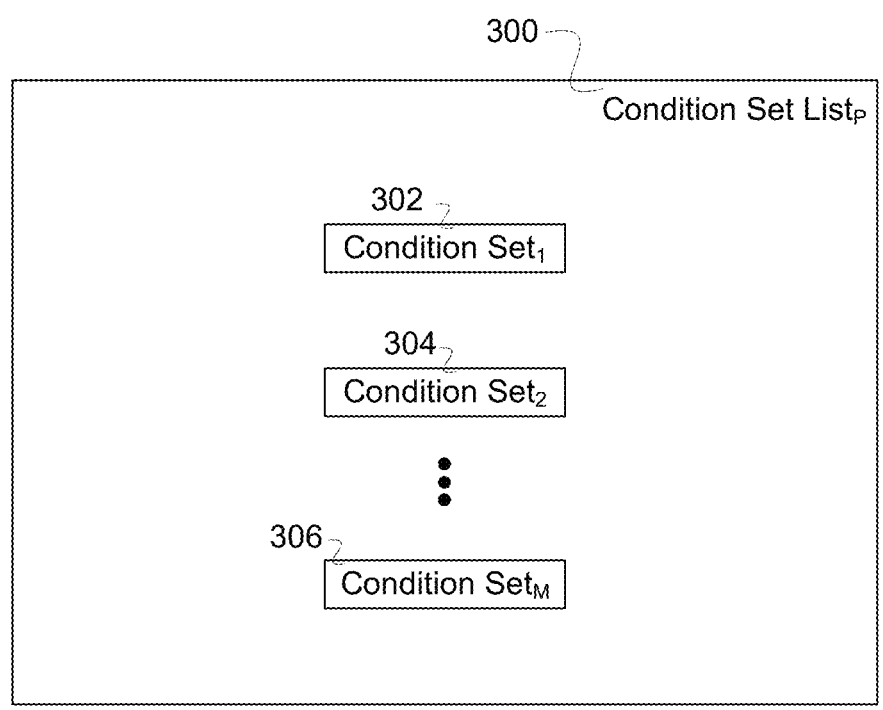
FIG. 3A is a diagram illustrating an embodiment of a condition set list.

FIG. 3A is a diagram illustrating an embodiment of a condition set list. In some embodiments, the condition set list of FIG. 3A is used to implement condition set list 285 of FIG. 2C or condition set list 276, condition set list 286, or condition set list 296 of FIG. 2D. In the example shown, a condition expression can use condition sets in a corresponding transaction block condition set list to construct any given portion of the condition expression. Condition set list$_P$ 300 includes condition set$_1$ 302, condition set$_2$ 304, . . . condition set$_M$ 306, etc.

In some embodiments, the condition expression or a condition set of the transaction block comprises a Boolean expression that is evaluated as either true, false, or null. In some embodiments, the Boolean expression includes a Boolean operator. The Boolean expression can contain any number of instances of any of the common Boolean operations (e.g., AND, OR, XOR, NAND, NOR, XNOR, NOT, etc.). In some embodiments, the Boolean expression includes an operand comprising a previously evaluated transaction block condition expression. In some embodiments, the Boolean expression includes an operand comprising a condition set. In various embodiments, the condition set comprises one or more of the following: a greater than or a greater than or equal to operator, a less than or less than or equal to operator, an equal to operator, a time and/or a date, a database data and a condition using the database data (e.g., a condition related to a value of the database data, a condition related to whether the database data was previously read, previously written, not previously read, not previously written, a prior read time and/or a read date, a prior write time and/or a write date, a current value of database data, a relative value from current value of database data, etc.). In various embodiments, data in the database comprises numbers, strings, dates, times, bytes, floating point values, or any other appropriate data.

Figure 3B:
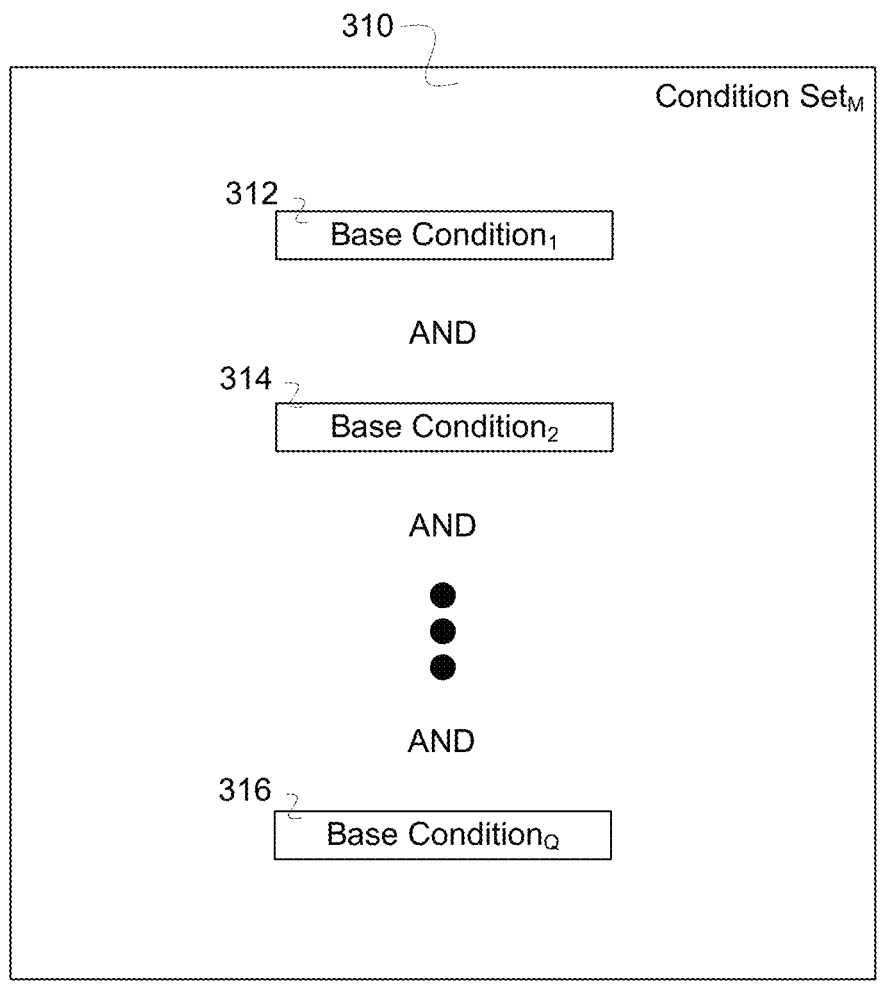
FIG. 3B is a diagram illustrating an embodiment of a condition set.

FIG. 3B is a block diagram illustrating an embodiment of a condition set. In some embodiments, the condition set of FIG. 3B is used to implement condition set 287, condition set 289, or condition set 291 of FIG. 2C or condition set 302, condition set 304, or condition set 306 of FIG. 3A. In the example shown, condition set$_M$ 310 includes base condition$_1$ 312, base condition$_2$ 314, and base condition$_Q$ 316. In some embodiments, a condition set comprises an expression that includes one or more base conditions that are evaluated and subsequently the results are AND'ed together. In some embodiments, a condition set comprises an expression that includes one or more base conditions that are evaluated and subsequently the results are OR'ed together (an alternative to the condition set shown in FIG. 3B). In various embodiments, a condition set comprises an expression that includes one or more base conditions that are evaluated and subsequently the results are AND'ed, OR'ed, XOR'ed, NAND'ed, NOR'ed, XNOR'ed, and/or NOT'ed together (an alternative to the condition set shown in FIG. 3B), or any other appropriate combination of operations.

In some embodiments, condition sets are a separated list of conditions with an operator between them (e.g., an implicit AND operator). This configuration is efficient as transaction may have a long list of objects whose revision value must not have changed between the time the system reads an object and a transaction commit is attempted. In some embodiments, transaction blocks share similar lists of revision checks, so it can be efficient to be able to abstract this list out as a condition set that is referenced instead of being repeated inside each transaction block.

In some embodiments, the condition set includes a condition with the state of a prior transaction block (e.g., whether the prior transaction block's condition passed or failed).

Figure 4A:
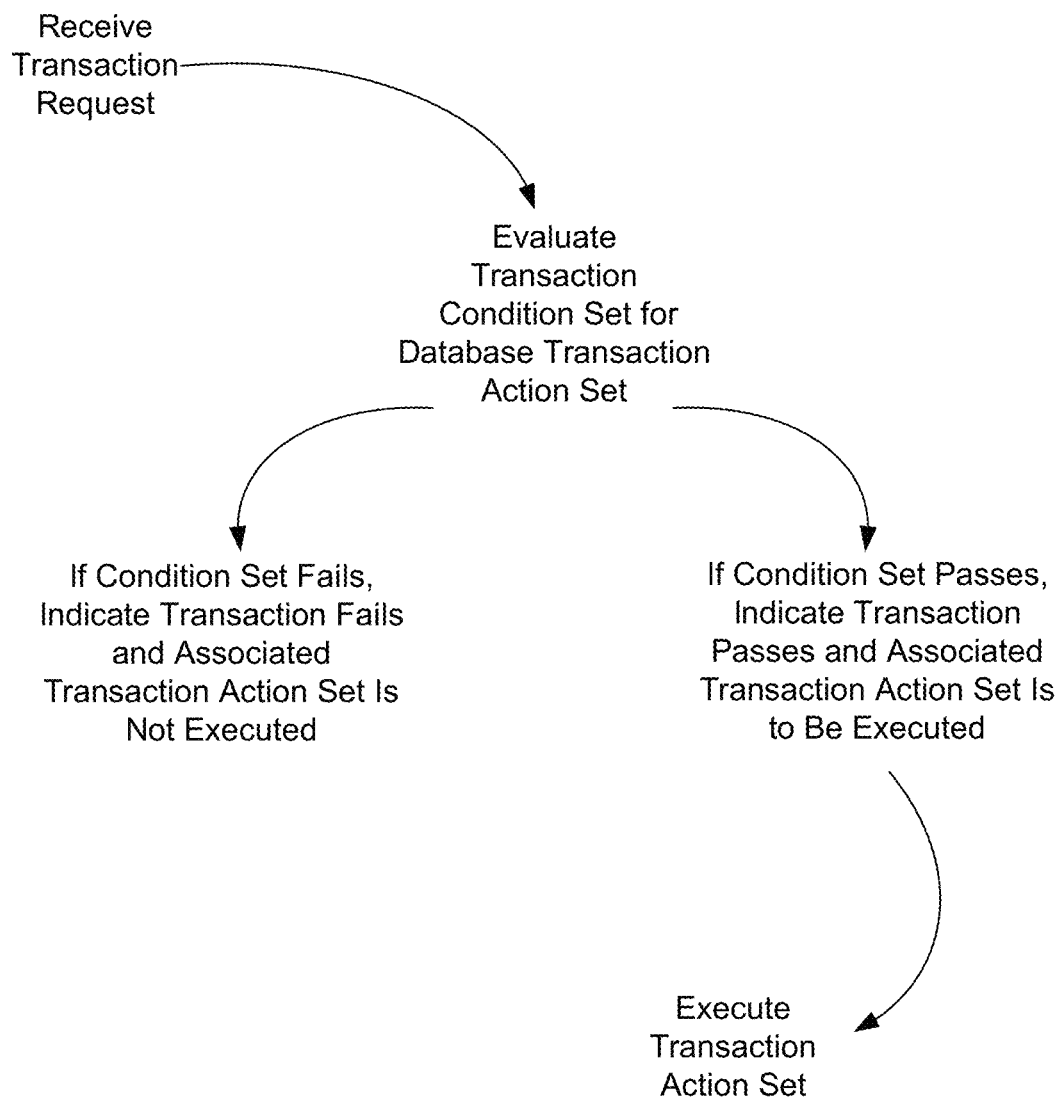
FIG. 4A is a diagram illustrating an embodiment of a process for conditional commit transaction processing.

FIG. 4A is a diagram illustrating an embodiment of a process for conditional commit transaction processing. In some embodiments, the process of FIG. 4A is executed by the system of FIG. 1. In the example shown, a simple transaction request is received and transaction condition set of the transaction request is evaluated for a database transaction action set to be executed. In response to the condition set failing or not passing, it is indicated that the transaction has failed, and the associated transaction action set is not executed. In some embodiments, an indication that the transaction has failed is logged or reported to a user, an original requestor, and/or an administrator. In response to the condition set passing or not failing, it is indicated that the transaction has passed, and the associated transaction action set is executed. In some embodiments, an indication that the transaction has passed is logged or reported to a user, an original requestor, and/or an administrator. The system executes or causes to be executed the transaction action set. In some embodiments, once the transaction has been committed, then any notifications and/or indications are made to prevent false positives.

Figure 4B:
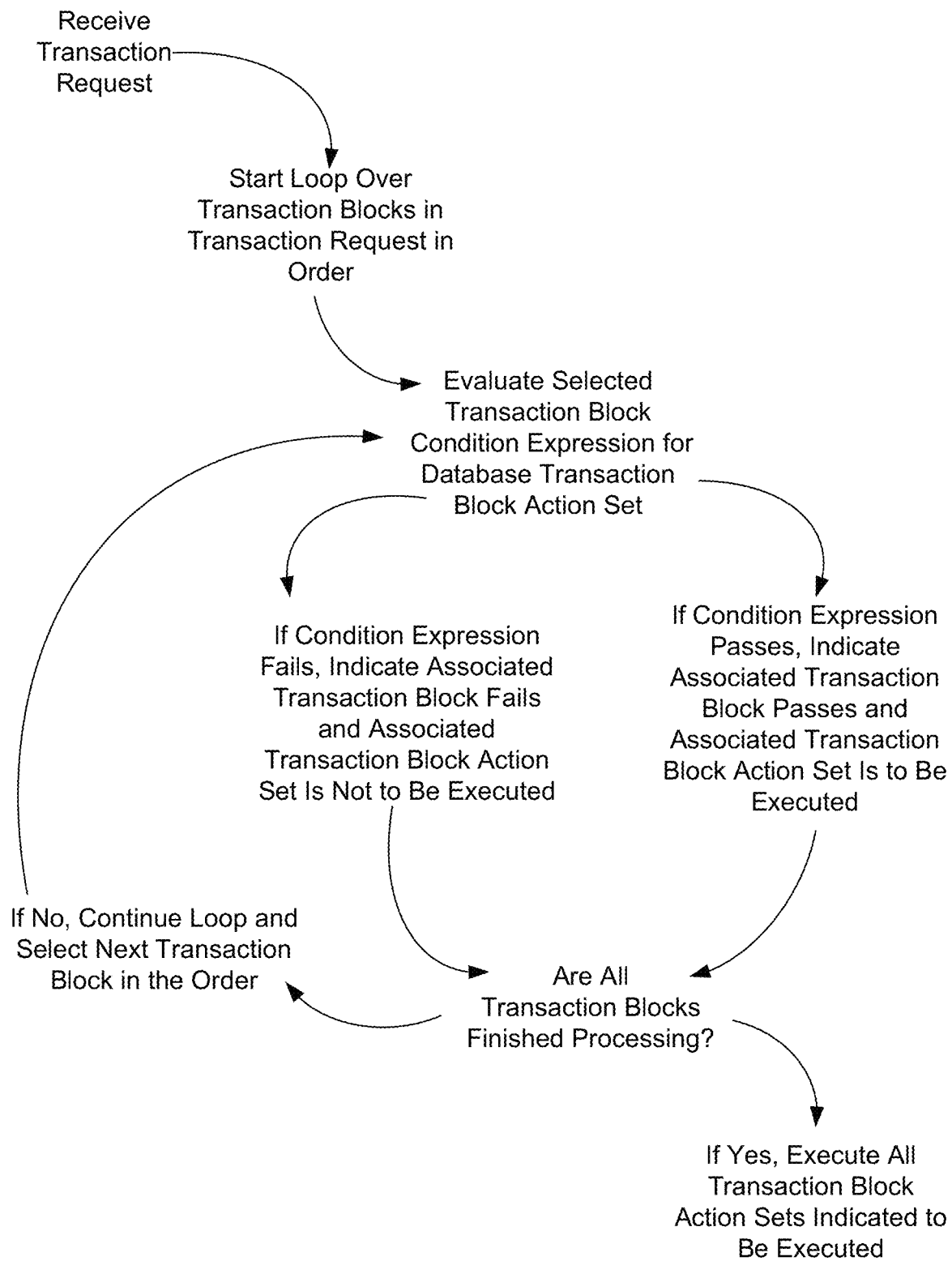
FIG. 4B is a diagram illustrating an embodiment of a process for conditional commit transaction processing.

FIG. 4B is a diagram illustrating an embodiment of a process for conditional commit transaction processing. In some embodiments, the process of FIG. 4B is executed by the system of FIG. 1. In the example shown, a transaction request with transaction block(s) is received. A loop is started to process the transaction blocks of the transaction request in the order given. The selected transaction block condition expression is evaluated for determining whether to execute the database transaction block action set. In response to the condition expression failing or not passing, it is indicated that the selected transaction block has failed and that the associated transaction block action set is not to be executed. In some embodiments, an indication that the transaction block has failed is logged or reported to a user, an original requestor, and/or an administrator. In response to the transaction block condition expression passing or not failing, it is indicated that the transaction block has passed and that the associated transaction block action set is to be executed. In some embodiments, an indication that the transaction block has passed is logged or reported to a user, an original requestor, and/or an administrator. After determining whether the condition expression has passed or failed and making note of the appropriate indication, it is determined whether all of the transaction blocks have finished processing. In some embodiments, indications of success or failure are accumulated in the loop, but are not sent anywhere until after the final transaction commit happens. In response to not all transaction blocks have been processed, then the next transaction block in the order is selected and control passes back to the top of the loop. In response to all of the transaction blocks have been processed, then all of the transaction block action sets that are indicated to be executed are executed. In some embodiments, after it is indicated that the transaction block action sets are to be executed, the system executes or causes to be executed the transaction action sets that have passed their condition expressions in the order given.

Figure 5A:
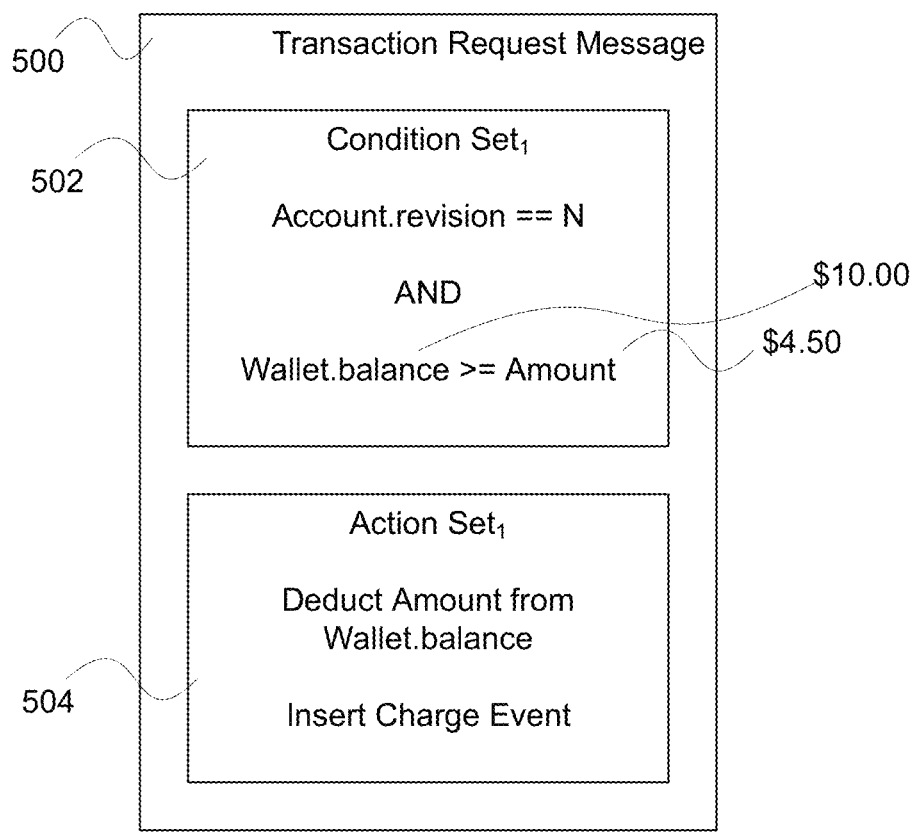
FIG. 5A is a block diagram illustrating an example embodiment of a transaction request message.

FIG. 5A is a block diagram illustrating an embodiment of a transaction request message. In some embodiments, transaction request message of FIG. 5A is processed by transaction block processor 106 of FIG. 1. In the example shown, transaction request message 500 includes condition set$_1$ 502. Condition set$_1$ 502 includes condition account.revision==N AND wallet.balance>=amount. Action set$_1$ 504 includes actions deduct amount from wallet.balance and insert charge event. Transaction request 500 is related to a use case of a rating application that processes mobile network usage for a family plan account so several users share the same account and same wallet balance. The application is multi-threaded so that there may be multiple network usage requests being processed in parallel for the same account and wallet balance. In the example shown, a network usage request is being processed by an application thread that calculates an amount of a cost for a call (e.g., $4.50) for the request. The wallet has a balance value (e.g., $10.00) when first read by the application thread and there are no wallet balance notification thresholds defined for the account.

In this case, the transaction block is implicit and there is only one. Note related to the condition account.revision==N, N is the revision that was read by the application before a calculation phase. This condition ensures that nothing major has changed in the account in the interim, such as suspension of the account, purchase of a different set of offers, etc. Also, note that wallet.balance>=$4.50, wallet balance must have sufficient funds in the account to cover the requested network usage. The wallet balance does not need to be the original balance value read, but it must still be at least $4.50 at commit time to cover the cost of the request.

In the example shown, the action of deducting the amount (e.g., $4.50) from the wallet.balance will reduce the existing wallet balance by the amount of the request to charge the wallet for the requested event. The action of inserting a network charge event comprises recording the network usage event to log (e.g., in a database) the details of the request and the resulting charge and/or the evaluation result of the expression.

Figure 5B:
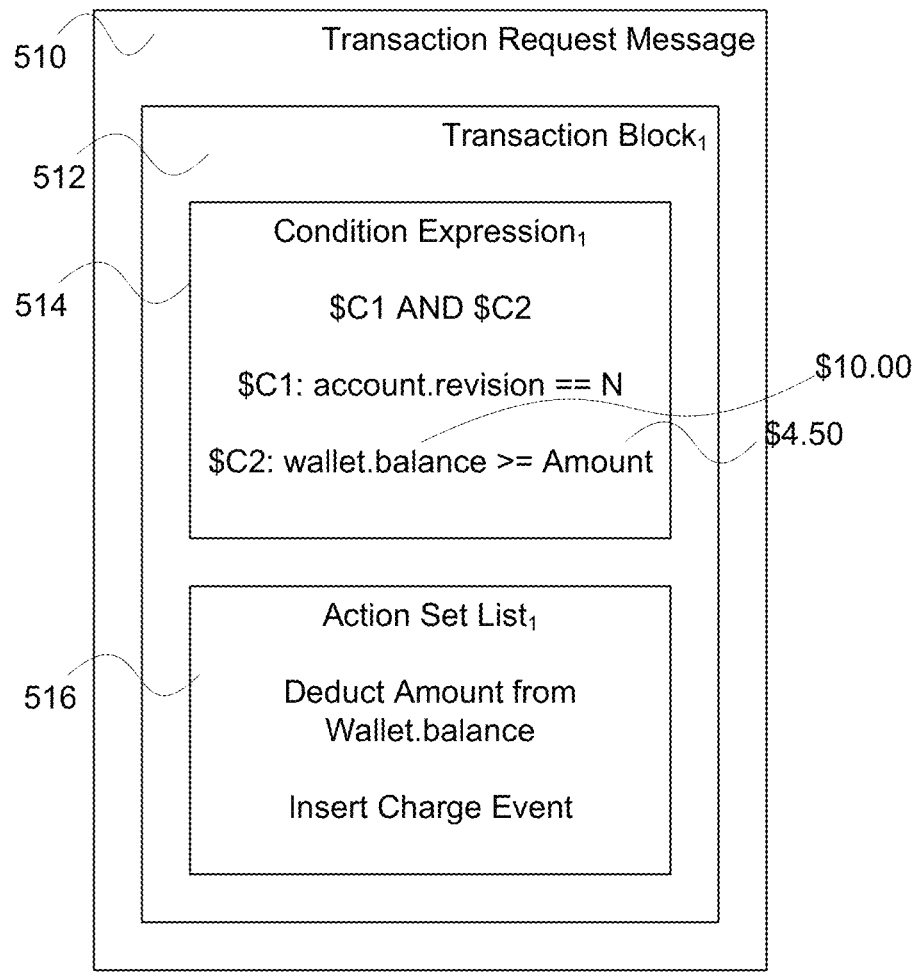
FIG. 5B is a block diagram illustrating an example embodiment of a transaction request message.

FIG. 5B is a block diagram illustrating an embodiment of a transaction request message. In some embodiments, transaction request message of FIG. 5B is processed by transaction block processor 106 of FIG. 1. In the example shown, transaction request message 510 includes transaction block$_1$ 512 comprising condition expression$_1$ 514 and action set list$_1$ 516. Condition expression$_1$ 514 includes $C1 AND $C2, where $C1: account.revision==N and $C2: wallet.balance>=amount. Action set list$_1$ 516 includes actions deduct amount from wallet.balance and insert charge event. Transaction request 510 is related to a use case of a rating application that processes mobile network usage for a family plan account so several users share the same account and same wallet balance. The application is multi-threaded so that there may be multiple network usage requests being processed in parallel for the same account and wallet balance. In the example shown, a network usage request is being processed by an application thread that calculates an amount of a cost for a call (e.g., $4.50) for the request. The wallet has a balance value (e.g., $10.00) when first read by the application thread and there are no wallet balance notification thresholds defined for the account.

In this case, the transaction block (e.g., transaction block$_1$ 512) is explicit and there is only one. Note related to the condition $C1: account.revision==N, N is the revision that was read by the application before a calculation phase. This condition ensures that nothing major has changed in the account in the interim, such as suspension of the account, purchase of a different set of offers, etc. Also, note that condition $C2: wallet.balance>=$4.50, wallet balance must have sufficient funds in the account to cover the requested network usage. The wallet balance does not need to be the original balance value read, but it must still be at least $4.50 at commit time to cover the cost of the request.

In the example shown, the action of deducting the amount (e.g., $4.50) from the wallet.balance will reduce the existing wallet balance by the amount of the request to charge the wallet for the requested event. The action of inserting a network charge event comprises recording the network usage event to log (e.g., in a database) the details of the request and the resulting charge and/or the evaluation result of the expression.

Figure 6A:
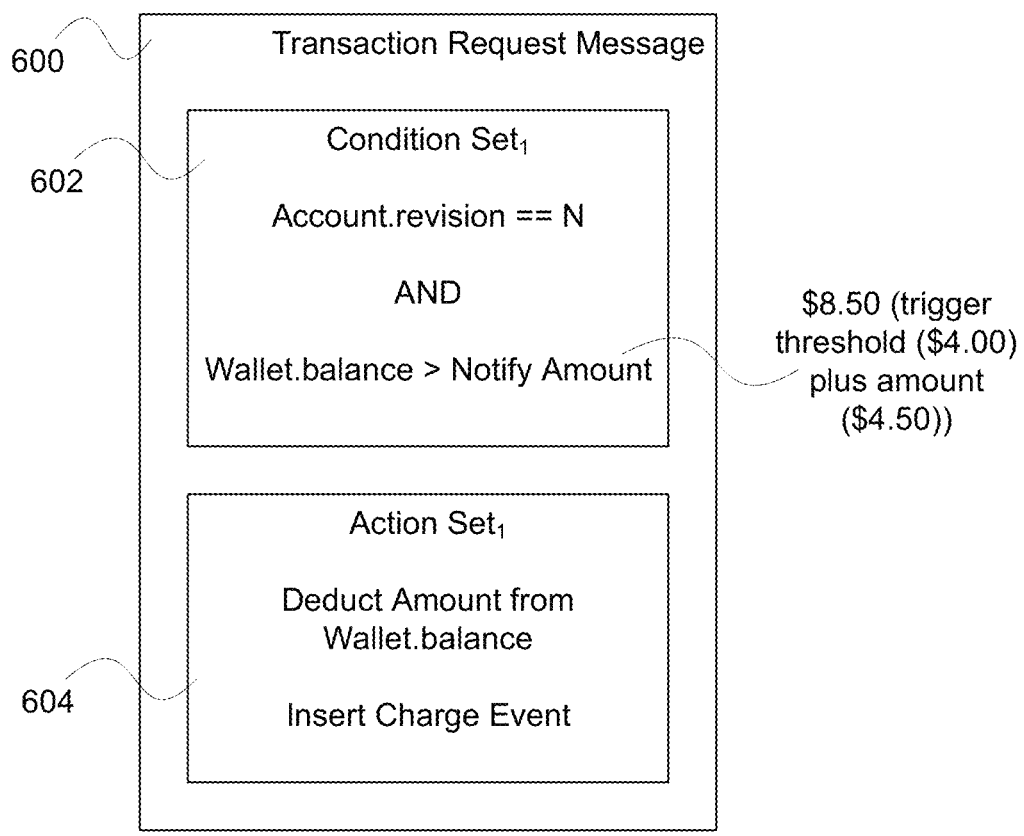
FIG. 6A is a block diagram illustrating an example embodiment of a transaction request message.

FIG. 6A is a block diagram illustrating an embodiment of a transaction request message. In some embodiments, transaction request message of FIG. 6A is processed by transaction block processor 106 of FIG. 1. In the example shown, transaction request message 600 includes condition set$_1$ 602. Condition set$_1$ 602 includes condition account.revision==N AND wallet.balance>Notify amount. Action set$_1$ 604 includes actions deduct amount from wallet.balance and insert charge event. Transaction request 600 is related to a use case of a rating application that processes mobile network usage for a family plan account so several users share the same account and same wallet balance. The application is multi-threaded so that there may be multiple network usage requests being processed in parallel for the same account and wallet balance. In the example shown, a network usage request is being processed by an application thread that calculates an amount of a cost for a call (e.g., $4.50) for the request. The wallet has a balance value (e.g., $10.00) when first read by the application thread and there is a wallet balance notification threshold (e.g., $4.00) defined for the account at a Notify amount (e.g., $8.50=$4.00+$4.50). To clarify a bit, the wallet balance notification threshold amount (e.g., the amount of $4.00) is the balance value that, when the actual balance value decreases to match or cross it, a notification event should be generated. The Notify amount is an artificial value derived by the business logic for this specific transaction-once it knows this transaction will deduct the amount for the cost for the call (e.g., $4.50 in this case above) from the balance, it can calculate that in order to NOT trigger a balance notification the balance value at commit time must still be greater than a Notify amount (e.g., in this case greater than $8.50) otherwise deducting the amount for the cost of the call (e.g., in this case the $4.50) would trigger the notification event which this transaction did not prepare for (since the original balance value read was >$8.50).

In this case, the transaction block is implicit and there is only one. Note related to the condition account.revision==N, N is the revision that was read by the application before a calculation phase. Also, note that wallet.balance>$8.50, wallet balance must have sufficient funds in the account to be above the notification threshold. Again the real issue here is that the balance after the transaction is completed must still be above the threshold value. The wallet balance does not need to be the original balance value read, but it must still be at least $8.50 at commit time to make sure that the wallet balance stays above a notification threshold. This ensures that the system is not required to make a notification. Since this transaction request only includes a single implied transaction block, the transaction must fail if the notification threshold will be crossed as the event action list does not include entering the notification of crossing the threshold in the database. The application is then required to resubmit the transaction.

In the example shown, the action of deducting the amount (e.g., $4.50) from the wallet.balance will reduce the existing wallet balance by the amount of the request to charge the wallet for the requested event. The action of inserting a network charge event comprises recording the network usage event to log (e.g., in a database) the details of the request and the resulting charge and/or the evaluation result of the expression.

Figure 6B:
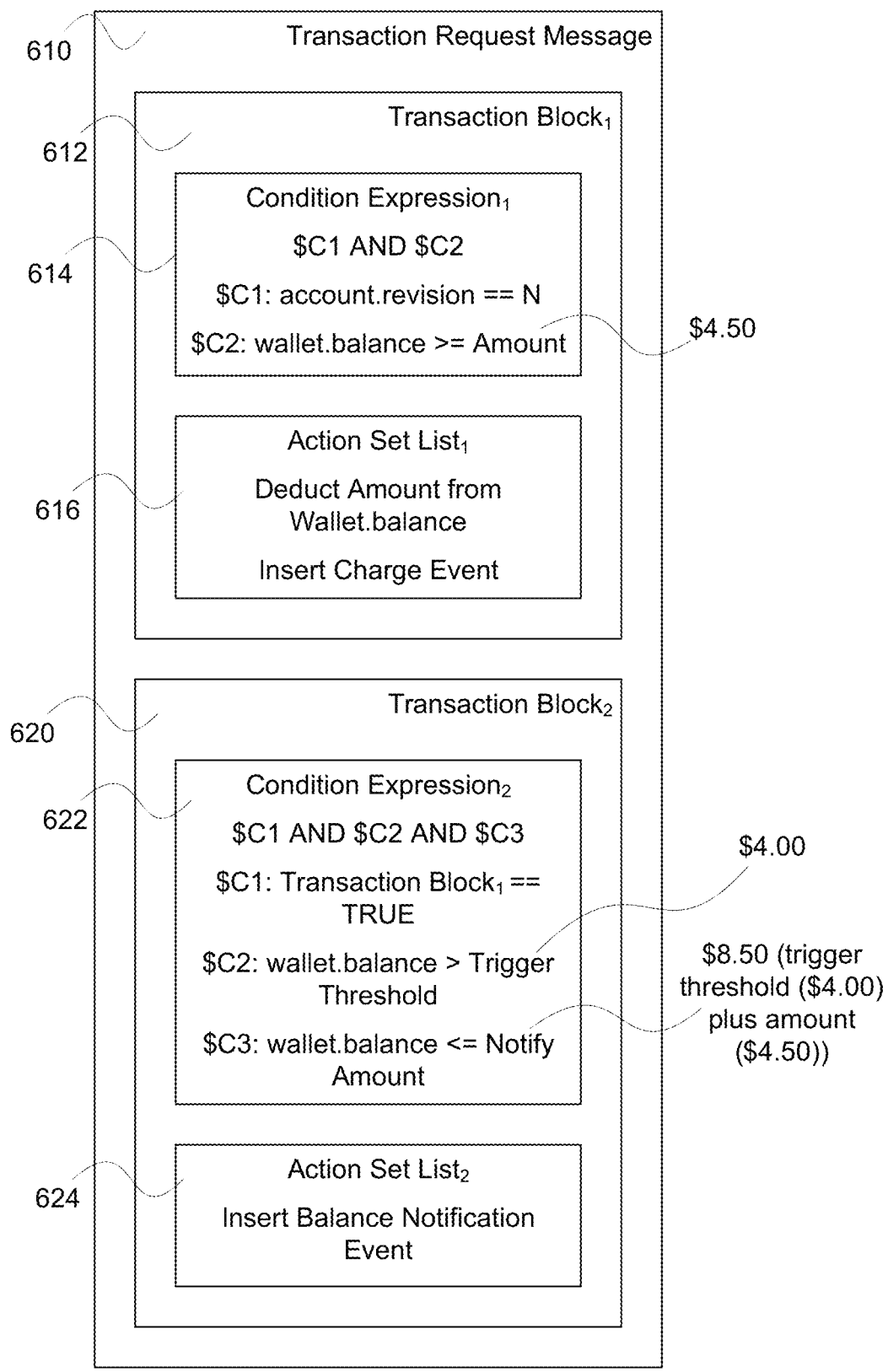
FIG. 6B is a block diagram illustrating an example embodiment of a transaction request message.

FIG. 6B is a block diagram illustrating an embodiment of a transaction request. In some embodiments, transaction request message of FIG. 6B is processed by transaction block processor 106 of FIG. 1. In the example shown, transaction request message 610 includes transaction block$_1$ 612 and transaction block$_2$ 620. Transaction block$_1$ 612 includes condition expression$_1$ 614 and action set list$_1$ 616. Condition expression$_1$ 614 includes condition $C1 AND $C2, where $C1: account.revision==N and $C2: wallet.balance>=amount (e.g., $4.50). Action set list$_1$ 616 includes deduct amount from wallet.balance and insert charge event. Transaction block$_2$ 620 includes condition expression$_2$ 622 and action set list$_2$ 624. Condition expression$_2$ 622 includes condition $C1 AND $C2 AND $C3, where $C1: Transaction Block$_1$==TRUE; $C2: wallet.balance>=Trigger Threshold (e.g., $4.00); and $C3: wallet.balance<=Notify Amount (e.g., $8.50=trigger threshold ($4.00)+amount ($4.50)). Action set list$_2$ 624 includes insert balance notification event.

Transaction block$_1$ 612 is defined to do the charging for a network usage event. Transaction block$_2$ 620 is defined to trigger the balance notification event if appropriate. In this case, the rating and recording of the network usage event is valid as long as the balance is sufficient to pay for the event, independent of the notification trigger. This significantly reduces the circumstances that will abort the baseline transaction and force the application to reprocess.

Figure 7A:
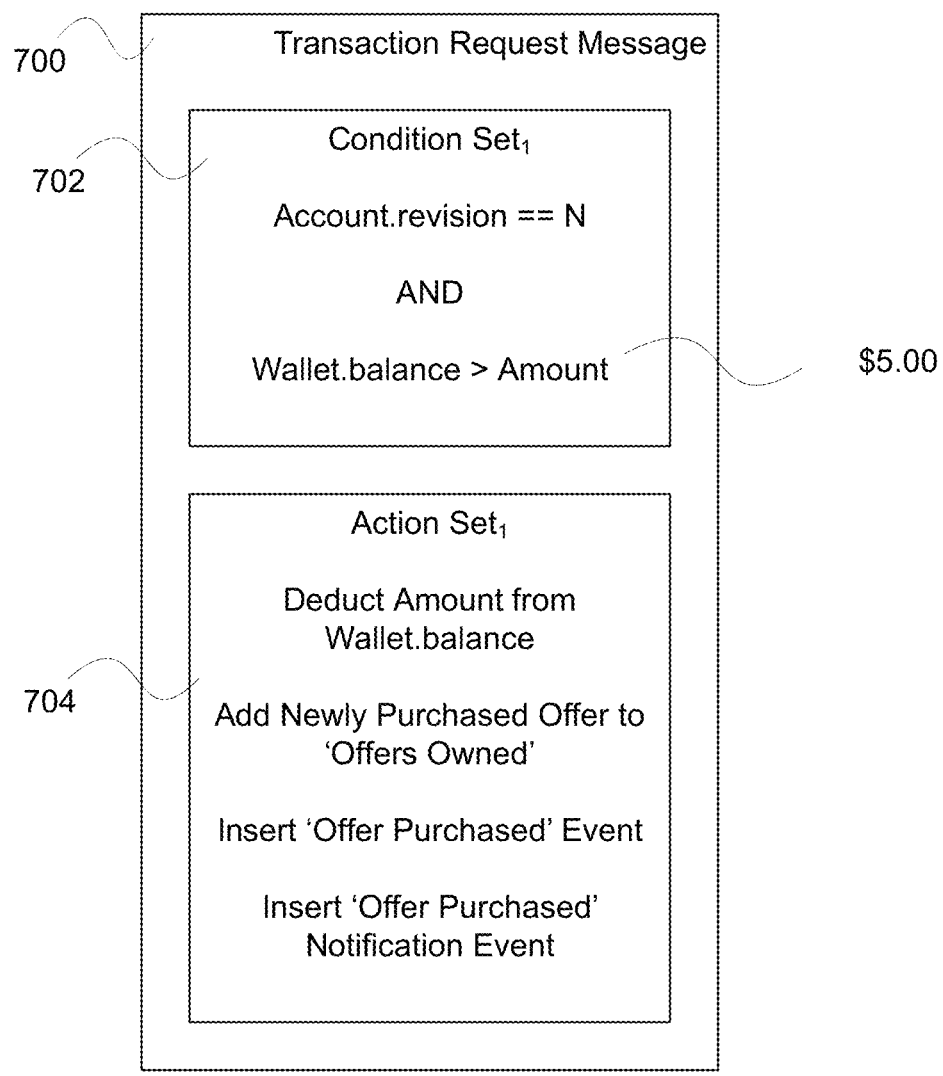
FIG. 7A is a block diagram illustrating an example embodiment of a transaction request message.

FIG. 7A is a block diagram illustrating an embodiment of a transaction request. In some embodiments, transaction request message of FIG. 7A is processed by transaction block processor 106 of FIG. 1. In the example shown, transaction request message 700 includes condition set$_1$ 702. Condition set$_1$ 702 includes condition account.revision==N AND wallet.balance>amount ($5.00). Action set$_1$ 704 includes actions deduct amount from wallet.balance; add newly purchased offer to 'Offers Owned;' insert 'Offer Purchased' event; and insert 'Offer Purchased' notification event. Transaction request 700 is related to a use case of a subscriber management application that receives a request from a customer relations management (CRM) application requesting that an additional offer costing $5.00 be purchased for a given user's account. The business rules require that if the purchase is successful, an 'Offer Purchased' notification must be sent to the user, but if the purchase fails due to insufficient funds, then an 'Offer Purchase Failed' notification must be sent to the user instead. The subscriber management application must submit a transaction to the database to enact the purchase and resulting notification.

In this case, the transaction block is implicit and there is only one. Note related to the condition account.revision==N, N is the revision that was read by the application before a calculation phase. Also, note that wallet.balance>=$5.00, wallet balance must have sufficient funds in the account purchase the offer.

In response to the transaction being rejected due to a failure condition, the application must retry the offer purchase. If the original transaction fails due to insufficient funds, then the retry of the application logic will detect the insufficient funds up front (during calculation) and submit a transaction to the database to trigger an offer purchase failed notification. If the original transaction failed due to the account being updated between the original read and the commit request, the retry may succeed or fail based on what exactly changed in the account state in that interim.

In the example shown, the action of deducting the amount (e.g., $5.00) from the wallet.balance will reduce the existing wallet balance by the amount of the request to charge the wallet for the requested event (e.g., pays for the action). The adding of the newly purchased offer to the 'offers owned' array in the user's account enables a user to use the offer in a future rating event. Inserting the 'offer purchased' event into the database records the action for the system. And, inserting the 'offer purchased' notification event in the database enables notification of the user of the offer purchase.

Figure 7B:
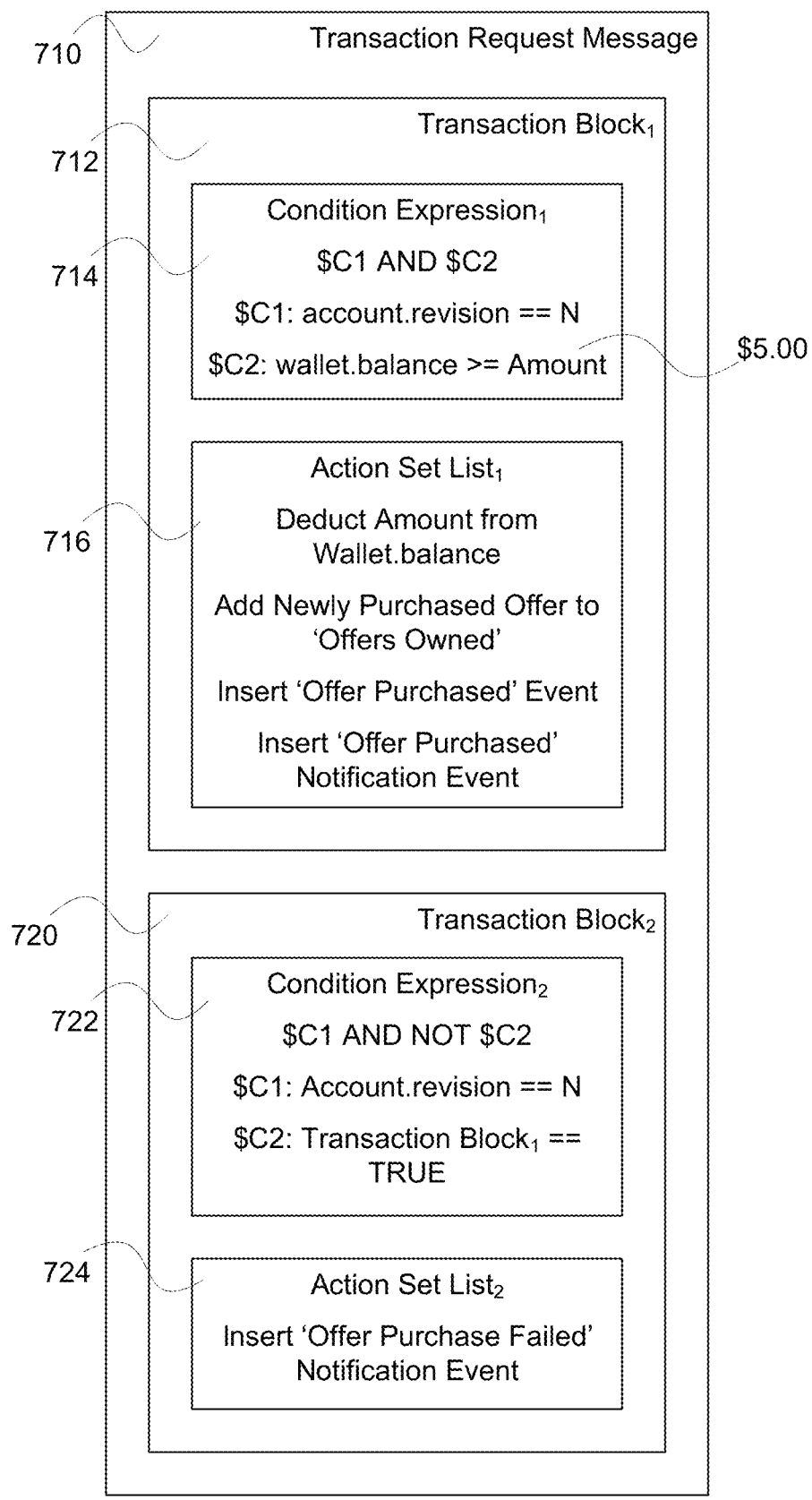
FIG. 7B is a block diagram illustrating an example embodiment of a transaction request message.

FIG. 7B is a block diagram illustrating an embodiment of a transaction request. In some embodiments, transaction request message of FIG. 7B is processed by transaction block processor 106 of FIG. 1. In the example shown, transaction request message 710 includes transaction block$_1$ 712 and transaction block$_2$ 720. Transaction block$_1$ 712 includes condition expression$_1$ 714 and action set list$_1$ 716. Condition expression$_1$ 714 includes condition $C1 AND $C2, where $C1: account.revision==N and $C2: wallet.balance>=amount ($5.00). Action set list$_1$ 716 includes actions: deduct amount from wallet.balance; add newly purchased offer to 'Offers Owned;' insert 'Offer Purchased' event; and insert 'Offer Purchased' notification event. Transaction block$_2$ 720 includes condition expression$_2$ 722 and action set list$_2$ 724. Condition expression$_2$ 722 includes condition $C1 AND NOT $C2, where $C1: account.revision==N and $C2: Transaction Block$_1$==TRUE. Action set list$_2$ 724 includes actions: insert 'Offer Purchased Failed' notification event.

Transaction request message 710 is related to a use case of a subscriber management application that receives a request from a customer relations management (CRM) application requesting that an additional offer costing $5.00 be purchased for a given user's account. The business rules require that if the purchase is successful, an 'Offer Purchased' notification must be sent to the user, but if the purchase fails due to insufficient funds, then an 'Offer Purchase Failed' notification must be sent to the user instead. The subscriber management application must submit a transaction to the database to enact the purchase and resulting notification.

In this case, there are two transaction blocks. Note that is related to the condition account.revision==N, N is the revision that was read by the application before a calculation phase. Also, note that wallet.balance>=$5.00, wallet balance must have sufficient funds in the account to purchase the offer.

In this instance, if the purchase failed for a transient reason (e.g., the account was updated in the interim so the revision was not==N anymore), then the application can simply retry the operation, and it will read the updated account state before calculating the new transaction. However, if the purchase failed due to insufficient funds, the required purchase failure notification will be sent as a result of the original transaction request, so no further processing is necessary by the application.

Note that the same account.revision==N condition is used in both transaction blocks for this example and so these conditions can be abstracted out as a condition set and referenced by each transaction block instead of being explicitly listed as in FIG. 3A.

In the example shown, the action of deducting the amount (e.g., $5.00) from the wallet.balance will reduce the existing wallet balance by the amount of the request to charge the wallet for the requested event (e.g., pays for the action). The adding of the newly purchased offer to the 'offers owned' array in the user's account enables a user to use the offer in a future rating event. Inserting the 'offer purchased' event into the database records the action for the system. And, inserting the 'offer purchased' notification event in the database enables notification of the user of the offer purchase.

Figure 8:
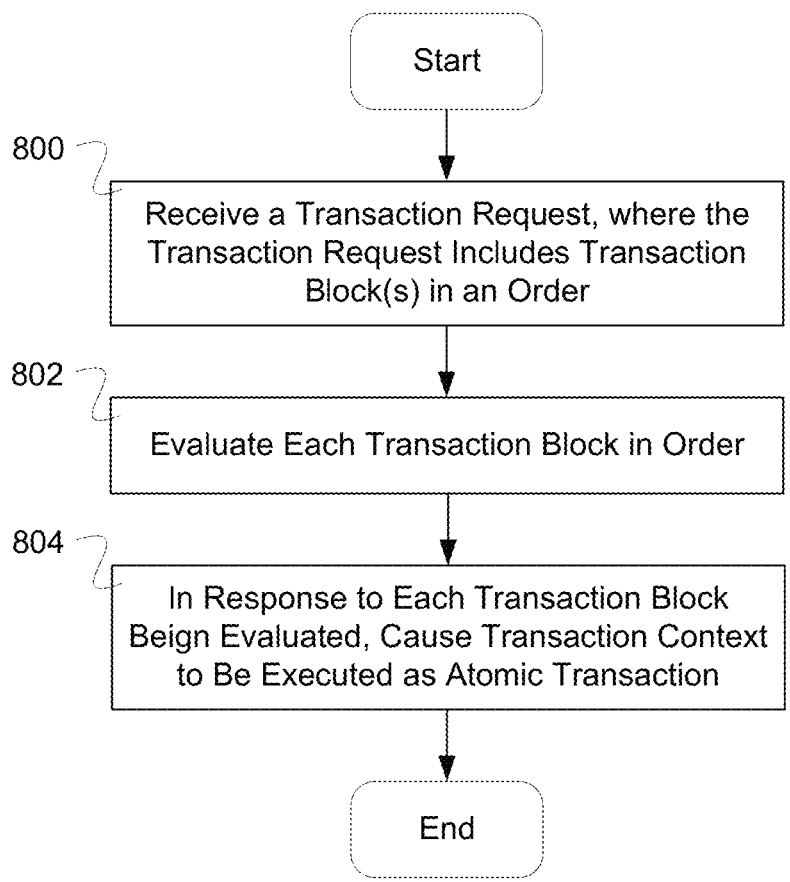
FIG. 8 is a flow diagram illustrating an embodiment of a process for transaction processing.

FIG. 8 is a flow diagram illustrating an embodiment of a process for a transaction request. In some embodiments, the process of FIG. 8 is executed using transaction processor 106 of FIG. 1. In the example shown, in 800 a transaction request is received, where the transaction request includes transaction block(s) in an order. For example, one or more transaction blocks are received as part of a transaction request message in a specific order. In 802, each transaction block is evaluated in order. For example, the transaction blocks each include condition(s) and action(s) where each transaction block's condition(s) is/are evaluated in the specific order and, if the condition passes, the action(s) associated with the transaction block is/are indicated to be executed in the specific order by adding the action(s) to a list of actions in a transaction context. In 804, in response to each transaction block being evaluated, the transaction context is caused to be executed as an atomic transaction. For example, the list of actions in the transaction context are executed or caused to be executed in the order that they were placed in the transaction context in an atomic transaction. In some embodiments, the transaction comprises an atomic, consistent, isolated, and durable (ACID) transaction.

In some embodiments, a database data referenced in a later transaction block in the order is modified by a prior action of a prior transaction block from a first state to a second state. In some embodiments, the database data of the first state is used in the later transaction block. In some embodiments, the database data of the second state is used in the later transaction block. In some embodiments, both the first state and the second state is available to be used in a later transaction block.

Figure 9:
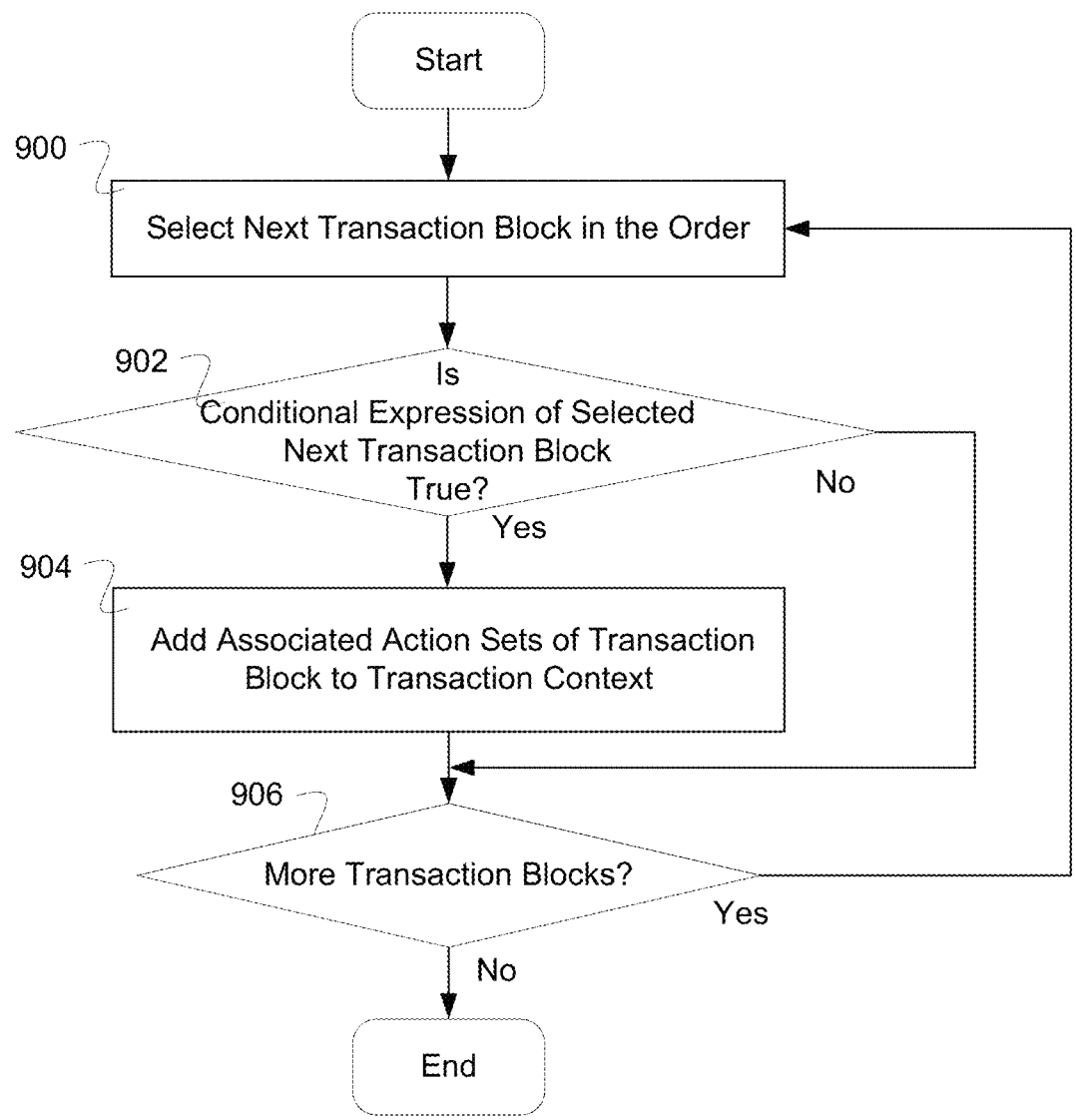
FIG. 9 is a flow diagram illustrating an embodiment of a process for transaction processing.

FIG. 9 is a flow diagram illustrating an embodiment of a process for transaction processing. In some embodiments, the process of FIG. 9 is used to implement 802 of FIG. 8. In the example shown, in 900 a next transaction block is selected in the order. In 902, it is determined whether the condition expression of the selected next transaction block is true. In response to determining that the condition expression of the selected next transaction block is true, in 904 the associated action sets of the transaction block are added to a transaction context and control passes to 906. In response to determining that the condition expression of the selected next transaction block is not true, control passes to 906. In 906, it is determined whether there are more transaction blocks. In response the there being more transaction blocks, control passes to 900. In response to there being no more transaction blocks, the process ends.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:
1. A database system, comprising:
  an interface, wherein the interface is configured to:
    receive a transaction request comprising one or more transaction blocks in an order; and a processor, wherein the processor is configured to:
  evaluate each transaction block of the one or more transaction blocks in the order by:
    determining in the order whether a condition expression of a transaction block of the one or more transaction blocks is true; and
    in response to the condition expression of the transaction block not being true, determining that there is another transaction block to evaluate; and
  in response to each of the transaction blocks being evaluated, cause a transaction context to be executed as an atomic transaction.

2. A database of claim 1, wherein a condition expression of the transaction block comprises a Boolean expression that is evaluated as either true or false or null.

3. A database of claim 2, wherein the Boolean expression includes a Boolean operator.

4. A database of claim 3, wherein the Boolean operator comprises one or more of AND, OR, XOR, NAND, NOR, XNOR, or NOT.

5. A database of claim 2, wherein the Boolean expression includes an operand comprising a previously evaluated transaction block condition expression.

6. A database of claim 2, wherein the Boolean expression includes an operand comprising a condition set.

7. A database of claim 6, wherein the condition set comprises a greater than or greater than or equal to operator.

8. A database of claim 6, wherein the condition set comprises a less than or less than or equal to operator.

9. A database of claim 6, wherein the condition set comprises an equal to operator.

10. A database of claim 6, wherein the condition set comprises a time and/or a date.

11. A database of claim 6, wherein the condition set comprises a database data and a condition using the database data.

12. A database of claim 6, wherein the condition set comprises a prior read time and/or a prior read date of a database data and a condition using the prior read time and/or the prior read date.

13. A database of claim 6, wherein the condition set comprises a prior write time and/or a prior write date of a database data and a condition using the prior write time and/or the prior write date.

14. A database of claim 6, wherein the condition set comprises a database data and a condition using a relative value from a current value of the database data.

15. A database of claim 1, wherein the processor is further configured to add an indication that the transaction block is skipped to a skipped transaction block list for the transaction in response to the transaction block condition expression being false.

16. A database of claim 15, wherein the processor is further configured to provide the skipped transaction block list.

17. A database of claim 1, wherein the atomic transaction further comprises one or more of a durable transaction for the database, a consistent transaction for the database, and/or an isolated transaction for the database.

18. A method for a database, comprising:
  receiving a transaction request comprising one or more transaction blocks in an order evaluating, using a processor, each transaction block of the one or more transaction blocks in the order by:
    determining in the order whether a condition expression of a transaction block of the one or more transaction blocks is true; and
    in response to the condition expression of the transaction block not being true, determining that there is another transaction block to evaluate; and
  in response to each of the transaction blocks being evaluated, causing a transaction context to be executed as an atomic transaction.

19. A computer program product for a database, the computer program product being embodied in a non-transitory computer readable storage medium and comprising computer instructions for:
  receiving a transaction request comprising one or more transaction blocks in an order
  evaluating, using a processor, each transaction block of the one or more transaction blocks in the order by:
    determining in the order whether a condition expression of a transaction block of the one or more transaction blocks is true; and
    in response to the condition expression of the transaction block not being true, determining that there is another transaction block to evaluate; and
  in response to each of the transaction blocks being evaluated, causing a transaction context to be executed as an atomic transaction.

* * * * *